United States Patent
Poole et al.

(10) Patent No.: US 6,445,382 B1
(45) Date of Patent: Sep. 3, 2002

(54) KEYBOARD WITH INTEGRATED POINTING STICK CABLE

(75) Inventors: David L. Poole, Portland; Robert M. Vandenboom, Markle, both of IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/528,324

(22) Filed: Mar. 20, 2000

Related U.S. Application Data

(63) Continuation-in-part of application No. 08/982,619, filed on Dec. 2, 1997, now Pat. No. 6,040,823.

(51) Int. Cl.[7] .................................................. G06F 1/16
(52) U.S. Cl. ........................ 345/168; 345/160; 345/161; 345/169; 361/680; 400/472
(58) Field of Search ................................. 345/160, 161, 345/168, 169; 365/680; 400/472

(56) References Cited

U.S. PATENT DOCUMENTS

| 4,246,452 A | * | 1/1981 | Chandler | 200/292 |
| 4,520,248 A | * | 5/1985 | Woelfel | 200/514 |
| 5,489,900 A | * | 2/1996 | Cali et al. | 200/6 A |
| 5,515,040 A | * | 5/1996 | Lee et al. | 340/870.04 |
| 5,594,618 A | * | 1/1997 | Sellers | 200/6 A |
| 5,659,334 A | * | 8/1997 | Yaniger et al. | 200/6 R |
| 5,697,718 A | * | 12/1997 | Erler et al. | 361/680 |

* cited by examiner

*Primary Examiner*—Bipin Shalwala
*Assistant Examiner*—Vincent E. Kovalick
(74) *Attorney, Agent, or Firm*—Mark P. Bourgeois; Mark W. Borgman

(57) ABSTRACT

A computer keyboard assembly has flexible membrane that is located adjacent a housing. The flexible membrane has circuit lines and an integral pointing stick cable. The circuit lines extend onto the pointing stick cable from the flexible membrane. Keys are electrically connected to the circuit lines. A backing plate structurally supports the flexible membrane. The membrane is located between the backing plate and the housing. A pointing module is attached to the backing plate. The pointing module is electrically connected to the pointing stick cable such that electrical signals from the pointing module are conducted to the circuit lines on the pointing stick cable. The pointing stick cable wraps around a side of the backing plate.

12 Claims, 2 Drawing Sheets

KEYBOARD WITH INTEGRATED POINTING STICK CABLE

CROSS REFERENCE TO RELATED AND CO-PENDING APPLICATIONS

This application is a continuation in part of U.S. patent application Ser. No. 08/982,619, filed Dec. 2, 1997 now U.S. Pat. No. 6,040,823 and entitled, "Integrated Keyboard and Navigational Control". The applications having a common assignee and a common inventor. The contents of which are specifically incorporated by reference in their entirety.

BACKGROUND OF THE INVENTION

1. Field of the Invention

This invention pertains generally to selective visual display systems, and particularly to display peripheral input devices of the joystick or pointing stick type. These devices find primary application with computer operators to control the position of a pointer or cursor on a computer display, though other applications combining keys and navigational control are well known and contemplated by the present inventors. For the purposes of this disclosure, a key will be defined herein as "a button or lever that is pressed with the finger to operate a machine." The machine may be selected from many types of devices, including remote controls for televisions, sound systems and other similar devices, computers and computer displays, appliances, airplanes (both radio controlled and otherwise), large and small machinery, land vehicles, and many other diverse devices too numerous to mention.

2. Description of the Related Art

Computing and calculating tools have existed in various form for thousands of years, dating back to devices such as the abacus. These tools simplified basic tasks, thereby saving time and allowing humans to direct their efforts to other important activities. With the advent of electronic circuits and systems came the development of general purpose computers, which could be used for more than one function. Through special programming, computers could be used to emulate or model other devices and systems, allowing the computer to be applied to diverse and complicated tasks. Many early general purpose computers depended upon punched cards or paper tapes for input of instructions, and, after performing necessary computation, printed output onto paper. This is referred to as batch processing. As might be expected, the instruction set would often be inadequate, and so an operator would be required to replace or add necessary instructions by replacing the punched cards. Needless to say, the computers were not well suited for performing instructions and operations in real time. Furthermore, the computers required large space and enormous electric power, frequently requiring entire rooms and special air-conditioning systems.

As microelectronics progressed, general purpose computers continued to become capable of more and more diverse tasks. Typewriter-style keyboards and other input devices replaced punched cards, and television-style video displays and electronic output complimented paper print-outs. Numerous further developments eventually led to the current interactive video display. Pictorial symbols, commonly known as icons and buttons, provide visual as well as textual identification of functions available to the computer user.

Through a navigational control, the user may simply move about the display and select from the icons and buttons. With improved user interface and enhanced capability, computers are now widely used. These computers, more powerful than the greatest super computers of only a few decades ago, are commonly referred to as personal computers or PC's. The enormous computational capability has led to applications for personal computers extending to areas well beyond the initial accounting and typewriter functions, and new applications are continuously being developed.

With the new applications and interactive video display has come a desire for better ways to provide input to the computer. While the keyboard continues to dominate as the best method for textual input, navigational functions including cursor position control are now primarily being performed with input devices such as a mouse, trackball, touch pad, joystick or pointing stick. These devices indicate the user's desire for cursor movement more naturally to the computer than a keyboard can. For example, the movement of a trackball or mouse in one direction, which may be at any angle on a planar surface from zero through 360 degrees, can be precisely translated to the computer. Furthermore, the amount of movement desired is also readily communicated by the relative rate of movement of the mouse or trackball. These desires are communicated from a relatively small device, most frequently smaller than a human hand.

Unfortunately, with a mouse, joystick or many trackballs the user must first remove one hand from the keyboard. Since, as aforementioned, the keyboard is still the primary source for textual input, the removal of one hand therefrom is most undesirable. Rapid placement of the hand upon a keyboard is nearly impossible, and nearly all computer users have experienced the frustration of incorrectly placing one or both hands on the keyboard and mistakenly typing incorrect keys. Furthermore, the mouse in particular requires a relatively large flat surface upon which to travel, which is often unavailable on crowded desktops or when the PC is a portable, notebook type computer.

In recognition of these and other drawbacks of the prior art, a number of devices have been modified or designed. Trackballs have been designed with much smaller dimension, as have touch pads. Unfortunately, neither of these devices is small enough to fit within the existing, already crowded typewriter style keyboard. When a mouse is unsuitable, the pointing stick is presently the most widely accepted device for navigational control. The pointing stick is a small stick, which protrudes vertically out from a keyboard, frequently between keys. The pointing stick incorporates several small sensors, frequently of the strain-gauge type, which sense applied force and direction with very little or no actual movement of the stick. Because the pointing stick is force-sensitive, rather than sensitive to actual movement, very little space is required. As already noted, that means that the pointing stick may be included within a keyboard. Furthermore, the pointing stick may be designed to be sensitive to force along all three spatial axes, rather than the two axes available to a mouse or trackball.

Placement of the pointing stick is frequently in the lower central region of a keyboard. This placement is arrived at out of convenience, allowing a user to control the pointing stick with either the left or right pointer finger. Presently, these pointing sticks are manufactured separately from the balance of the keyboard, and placed within the keyboard during keyboard assembly. The pointing stick is electrically connected to a motherboard in the computer by a separate flexible cable.

The need for a separate cable assembly for the pointing stick and routing of the cable assembly not only adds to the cost of the finished computer, but complicates the assembly and makes the computer keyboard less compact.

SUMMARY OF THE INVENTION

In one manifestation, the invention provides a computer keyboard assembly that has a housing with several apertures through which keys pass. A flexible membrane is located adjacent the housing and has a first surface and a second surface. The flexible membrane has circuit lines on the first surface and an integral pointing stick cable. The circuit lines extend onto the pointing stick cable from the flexible membrane. The keys are electrically connected to the circuit lines on the first surface. A backing plate is structurally supporting the membrane. The membrane is located between the backing plate and the housing. A pointing module is attached to the backing plate. The pointing module is electrically connected to the pointing stick cable such that electrical signals from the pointing module are conducted to the circuit lines on the pointing stick cable. The pointing stick cable wraps around a side of the backing plate. The pointing module has a shaft that extends through an aperture in the backing plate and membrane and the shaft extends above the keys. The flexible film has a motherboard cable and an input button cable.

DESCRIPTION OF THE PREFERRED EMBODIMENT

Figure 1:
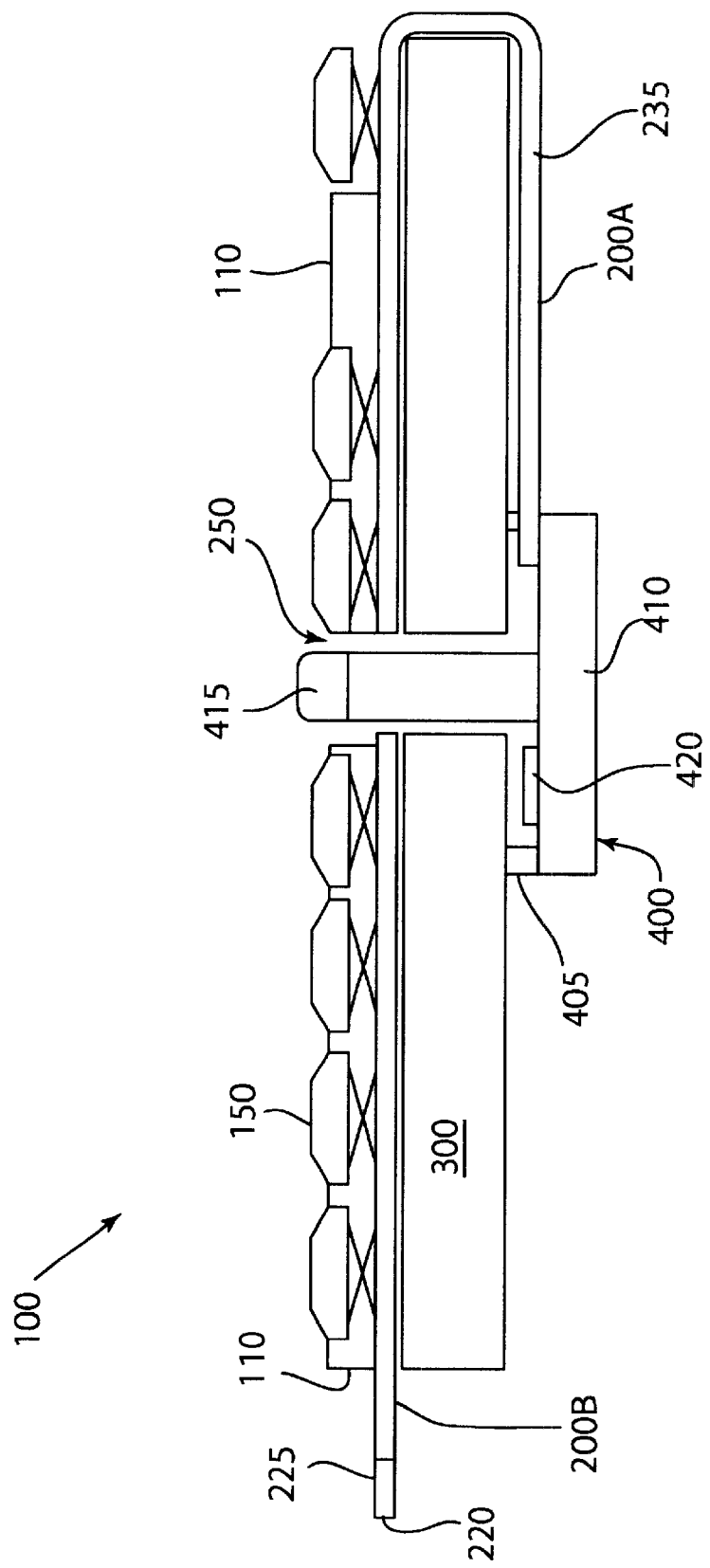
FIG. 1 illustrates a cross-sectional view of the preferred embodiment of a keyboard with integrated pointing stick cable.
Figure 2:
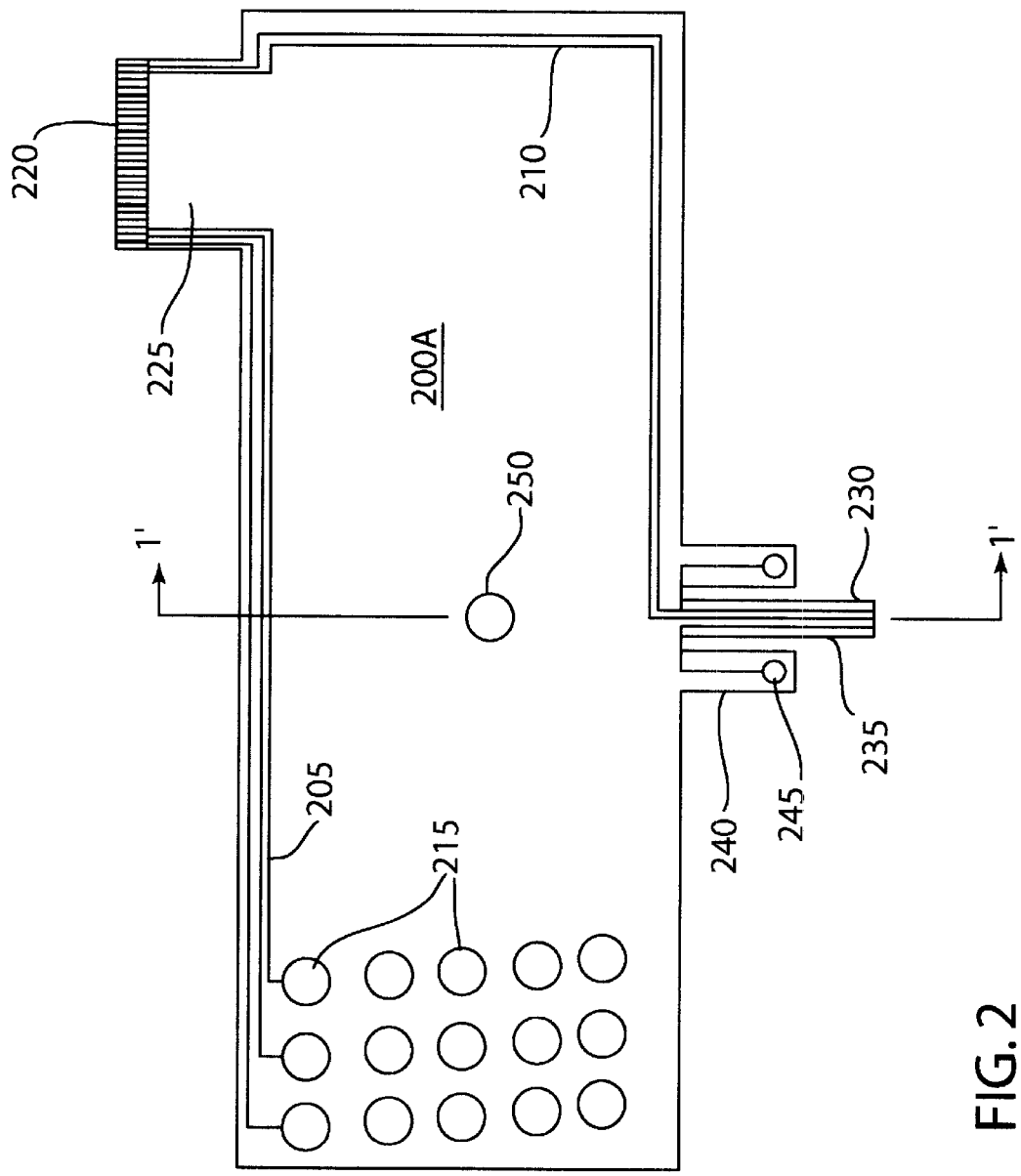
FIG. 2 is bottom view of the flexible film.

Referring to FIGS. 1 and 2, a keyboard assembly 100 is shown. Assembly 100 has a plastic molded housing 110, keyboard keys 150, flexible film or membrane 200, and backing plate 300. These are assembled to form a keyboard assembly 100. Keys 150 move upwardly and downwardly through housing 110 during depression by a user. It is important to note here that many features common to keyboards and well known in the art have been omitted from the figures to help emphasize components important to the preferred embodiment of the present invention, but they will be understood to be included as required and understood by one of ordinary skill. For example, only several keys 150 are illustrated, even though modern keyboards typically have one hundred or more keys. None of the electronic circuitry for the keyboard has been illustrated, and so forth. These omitted features are well known and common to computer keyboards and other combined keyboards and navigational controls of the prior art and will be understood to be included herein, even though not expressly illustrated. Materials suited for the keyboard housing 110 are usually selected from among polyamides, polyimides and copolymers such as acrylic-butadiene-styrene (ABS) plastics, but the material choice is not so limited.

Immediately adjacent to housing 110 is a flexible film or membrane 200 which serves as a printed wiring board with circuit lines patterned thereon. Film 200 is generally planar and is commercially available and usually fabricated from polyimide. Film 200 may be a single layer film or may be a multi-layer film. Film 200 is relatively flexible and pliant, for reasons to be detailed below. Film 200 has a first surface 200A and a second surface 200B. Flexible film 200 has a motherboard cable 225 extending away therefrom and a pointing stick cable 235 extending away from the flexible film 200 in a direction opposite that of the mother board cable. The mother board cable and pointing stick cables are integral extensions of the flexible film 200. Surface 200A has key circuit lines 205 and pointing stick circuit lines 210 patterned thereon. Membrane switch pads 215 are connected to key circuit lines 205. The other end of key circuit lines 205 terminate in motherboard connection terminals 220. Motherboard connection terminals 220 are attached to a computer motherboard (not shown) in a laptop or regular computer. Terminals 220 can be attached to the motherboard using solder or by using a connector. Pointing stick circuit lines 210 also connect with motherboard connection terminals 220 on one end and connect to pointing stick connection terminals 230 on the other end.

A pointing stick module 400 is shown attached to backing plate 300. A standoff 405 spaces module 400 from backing plate 300. Pointing stick module 400 has a base 410 and a shaft 415 extending perpendicularly from base 410. Shaft 410 extends upwardly through aperture 250 from base 410 to a point above keys 150. Pointing stick cable 235 is bent around a side of backing plate 300. Surface 200B is adjacent backing plate 300. Pointing stick cable 235 extends to pointing module 400. Pointing stick terminals 230 are electrically connected to terminals (not shown) on pointing stick module 400. Terminals 230 are connected to the terminals on module 400 using solder (not shown). Alternatively, terminals 230 could be connected using an electronic connector.

A pair of input button cables 240 extend from film 200 on each side of pointing stick cable 235. Cables 240 are parallel to cable 235. Input button cable 240 has circuit lines 210 thereon which terminate in input button membrane switches 245. Input button switches 245 are connected to a key (not shown) in the vicinity of pointing module 400 in order for a user to select an icon or initiate a, "mouse click action".

Pointing stick module 400 has electronic components 420 that process and condition signals from the pointing stick before they are transmitted on circuit lines 210 to the motherboard.

Backing plate 300 is mechanically attached to housing 110. This sandwiches flexible film 200 between housing 110 and plate 300. The material selected for backing plate 300 is not important, so long as the plate serves to provide the structural characteristics desired.

Once keyboard assembly 100 is complete, assembly 100 may be integrated into a computer housing or additional keyboard housing as is known in the art. In operation, a finger of a user applies pressure in any direction to shaft 415. This pressure is sensed by module 400 and transformed into an electrical signal that is representative of a direction and magnitude of force applied to the stick by the user. The electrical signal is transmitted over terminals 230, lines 210 and terminals 220 to the computer motherboard. A computer cursor control or pointer could then be moved in accord with the direction and magnitude of the applied force. The various keys may also be pressed and sensed through end connector circuit lines 205 and terminals 220.

The particular combination of features provides a keyboard assembly having few piece parts which is relatively easy to assemble. The molded housing 110 requires an only slightly reconfigured mold, and film 200 only requires a layout change.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example applications other than computer keyboards may preferably include only one or a few keys, and may have different relative proportions or dimensions from a computer keyboard. The present invention is contemplated for applications including, but not limited to computer keyboards. These types of alterations and variations for different use, which are well known in the keyboard, switch and navigational control arts, are considered incorporated herein. The scope of the invention is set forth and particularly described in the claims hereinbelow.

We claim:

1. A computer keyboard assembly comprising:
   a) a housing having a plurality of keys extending through;
   b) a flexible membrane located adjacent the housing, the flexible membrane having circuit lines and switch pads, the keys being adapted to mechanically close the switch pads when depressed;
   c) a pointing stick cable attached to the flexible membrane, the circuit lines extending onto the pointing stick cable from the flexible membrane;
   d) a backing plate having a first and a second surface, the backing plate supporting the membrane, the membrane located between the first surface of the backing plate and the housing; and
   e) a pointing module attached to the second surface of the backing plate, the pointing module electrically connected to the pointing stick cable such that electrical signals from the pointing module are conducted to the circuit lines on the pointing stick cable.

2. The keyboard according to claim 1, wherein the pointing stick cable wraps around a side of the backing plate.

3. The keyboard according to claim 1, wherein the pointing module has a shaft that extends through an aperture in the backing plate and the flexible membrane, the shaft extending between the keys.

4. The keyboard according to claim 3, wherein the flexible membrane has a motherboard cable extending therefrom.

5. The keyboard according to claim 4, wherein the flexible membrane has an input button cable extending therefrom.

6. The keyboard according to claim 2, wherein the pointing stick cable has an end located between the pointing module and the second surface.

7. An input device suitable for use in a selective visual display system, comprising:
   a) a keyboard, having:
      a1) a plurality of keys controlled by tactile force;
      a2) a generally planar backing plate having a first and a second surface;
   b) a flexible membrane located between the keys and the first surface of the backing plate, the flexible membrane having a plurality of circuit lines and switch pads thereon;
   c) a pointing stick cable extending from the flexible membrane, the pointing stick cable having a first end and a second end, the first end attached to the flexible membrane, the pointing stick cable wrapping around the backing plate from the first surface to the second surface; and
   d) a pointing module attached to the second surface of the backing plate, the pointing module electrically connected to the second end of the pointing stick cable such that electrical signals from the pointing module are conducted through the pointing stick cable to the flexible membrane.

8. The input device according to claim 7, wherein the pointing module has a shaft that extends through an aperture in the backing plate and the membrane, the shaft extending between the keys, the pointing module operable to receive an applied tactile force and to generate the electrical signal to control the selective visual display system.

9. The input device according to claim 7, wherein the flexible membrane has an attached motherboard cable.

10. The input device according to claim 7, wherein the flexible membrane has an attached input button cable.

11. The input device according to claim 7, wherein a standoff is located between the second surface of the backing plate and the pointing module to space the pointing module from the backing plate.

12. The input device according to claim 11, wherein the second end of the pointing stick cable is located between the pointing module and the second surface of the backing plate.

* * * * *